United States Patent [19]
Bellasio

[11] 3,863,861
[45] Feb. 4, 1975

[54] WIRE PAYING-OUT APPARATUS

[75] Inventor: Aldo Bellasio, Milan, Italy

[73] Assignee: Industrie Pirelli Societa per Azioni, Milan, Italy

[22] Filed: May 22, 1973

[21] Appl. No.: 362,770

[30] Foreign Application Priority Data
June 13, 1972  Italy .................................. 25588/72

[52] U.S. Cl. ............................... 242/128, 242/54 R
[51] Int. Cl. .......................................... B65h 49/00
[58] Field of Search ............. 242/54 R, 128, 129, 82

[56] References Cited
UNITED STATES PATENTS

| | | | |
|---|---|---|---|
| 1,830,449 | 11/1931 | Swank | 242/128 |
| 2,179,574 | 11/1939 | Cullin | 242/128 |
| 2,390,157 | 12/1945 | Kramer | 242/128 |
| 2,857,118 | 10/1958 | Rayburn | 242/128 |
| 3,136,496 | 6/1964 | McMartin | 242/54 R |
| 3,202,380 | 8/1965 | Hosbein | 242/128 |
| 3,434,677 | 3/1969 | Hannis et al. | 242/128 |

*Primary Examiner*—Leonard D. Christian
*Attorney, Agent, or Firm*—Brooks Haidt & Haffner

[57] ABSTRACT

Apparatus for guiding and controlling the paying off of wire from a drum for continuously feeding wire to a twisting machine or the like. The wire, stored in coils arranged around a cylindrical body is guided in its generally helical upward path by contact with a ring rotating with a peripheral speed four times the speed of linear advancement of the wire to prevent damage from rubbing of the wire against the cylindrical body about which it has been coiled. Means are provided for controlling the rate of rotation of the ring in response to the speed of the wire.

4 Claims, 4 Drawing Figures

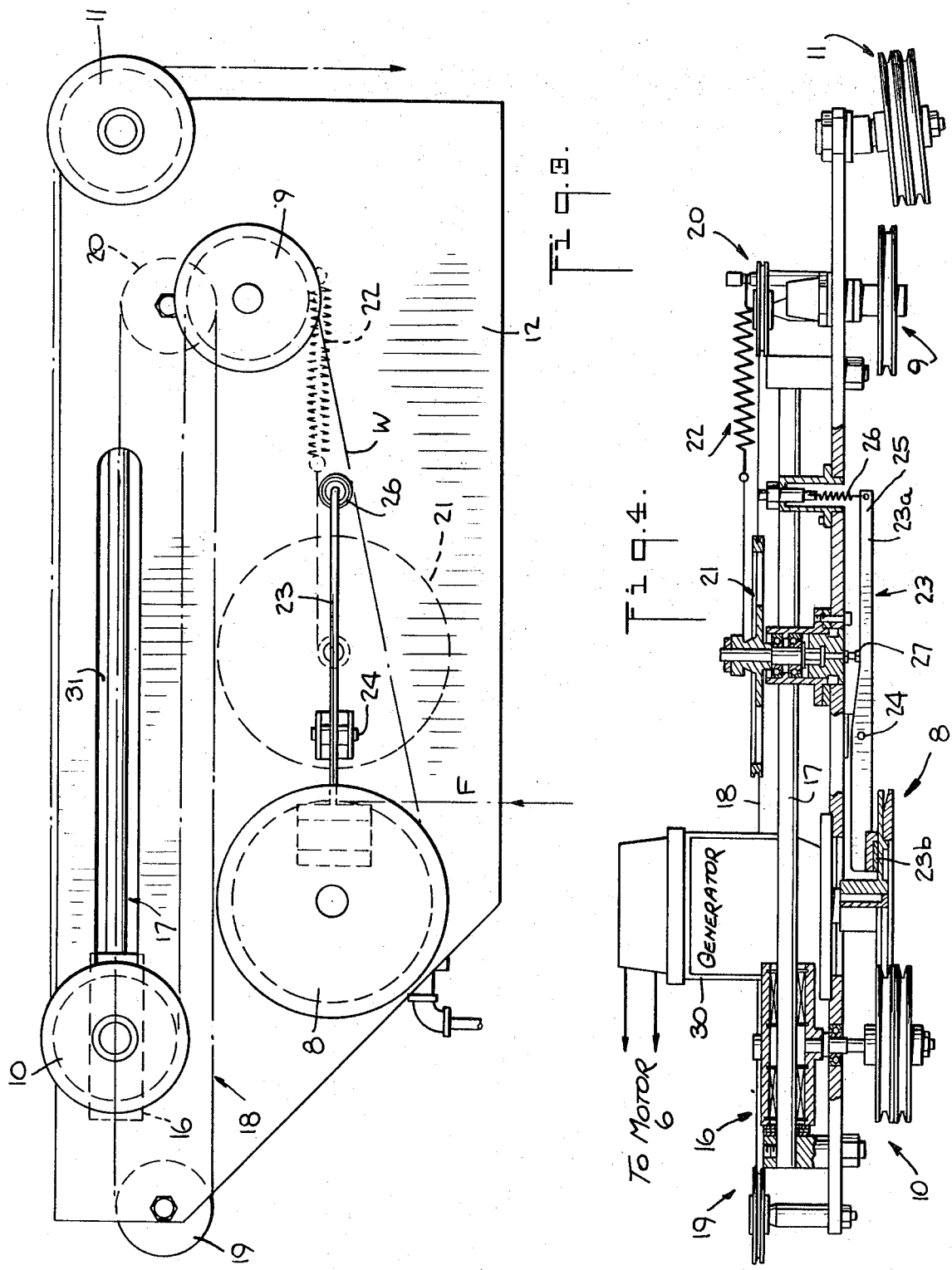

WIRE PAYING-OUT APPARATUS

BACKGROUND OF THE INVENTION

1. Field of the Invention

The present invention relates to the manufacture of electrical cables, and in particular to the paying-off of wires stored on drums, to machinery for forming such wires into telephone cables and the like. Still more precisely the invention concerns an apparatus able to pay off regularly and continuously, at the high production speeds employed in making telephone cables, a wire or wires stored in spiral coils inside one or more drums. The apparatus is especially suitable for use in association with twisting machines, whose task is that of stranding together several elementary wires.

2. Description of the Prior Art

In the manufacture of telephone cables, the bare conductor, after having been covered with a layer or layers of insulation material, is temporarily stored on collecting means. The wire so stored is subsequently continuously paid off and stranded with other wires by means of twisting machines or the like, to produce quads.

In accordance with certain prior art practices, wire has been collected on reels for storage until the wire is to be further processed, as by twisting together of several wires. However, the use of reels involves some difficulties, which are chiefly due to the speed of linear advancement of the wire, which is very high in some processing steps. The high rotation speed of a reel from which wire is rapidly unwound has caused problems including compensation for centrifugal force and inertia, and the balancing of the mass of a rapidly rotating wire wound reel. A further difficulty has arisen when a reel has been completely wound with wire and it is necessary to proceed to a new, empty reel, without lowering the linear speed of the wire itself or damaging the wire.

The first difficulty has been overcome either by providing improved winding-up devices, or by adopting reels carefully constructed and accurately balanced. These solutions have resulted in machines which are more expensive and more delicate, with high maintenance costs.

The problem of moving to a new, empty reel has not been solved by the prior art. Therefore, in order to eliminate this drawback and also to reduce the costs involved in delicate machinery, a different collecting means has been adopted, namely the so-called "drums." A drum of this type ordinarily comprises a central cylindrical body having a height equal to or greater than the height of piled up coils of wire to be accumulated about said cylindrical body, and if necessary, the drum also has an outer limiting external cylindrical surface at a certain distance from the cylindrical body. To store wire on such drums, the wire is conveyed towards a rotating head which forms coils of wire and causes the coils to advance. The coils, coming from the head, are laid in the drum in the form of successive layers piled up, one coil atop another.

The coils so stored on a drum have, of course, a diameter greater than that of the central cylindrical body, and they can be laid up in various ways, depending on whether the drum is held motionless or is driven at some rate of rotation, with an angular speed slower than the angular speed of the forming head.

By arranging the wire inside the drum, it is possible to eliminate the mechanical problems concerned with the speeds and masses encountered when wire is wound up about a reel, since the rotating head used in laying-up wire on a drum has only the function of forming the coils, and the head can therefore have a relatively small mass with respect to that of a reel. Moreover, since the drum is motionless or moving slowly, it is easy to pass from a filled drum to an empty one without interrupting or reducing the speed of advance of the wire and without damaging the wire. For these reasons, in the manufacture of electric cables, the use of drums instead of reels proves to be advantageous.

By way of example, drums of the type described are attractive for use in extrusion lines for insulating the cores of telephone cables with plastic material, where production can reach high speeds on the order of 1,500 to 2,000 meters per minute, and the articles produced are of delicate structure. Drums can also be advantageously employed to collect copper wire coming from drawing machines, in which case the wire is not insulated, and in the collection of small cables insulated with plastic material and produced by extrusion.

These uses of drums, however, involve difficulties in the operations necessary for paying off the wire. For instance, in the aforementioned case of producing cores of telephone cables insulated with plastic material, the processing step subsequent to the application of the insulation by extrusion is that of stranding several cores together. The twisting machines used for stranding such cores together can, in certain circumstances, reach a linear production speed of 400 to 500 meters per minute. Prior to the present invention, it has been possible to pay off wire from a drum only at speeds on the order of 200 – 250 meters per minute.

Those acquainted with this art will understand that the superposed layers of wire, laid-up on the drum as coils one atop another are not in a static condition as the wire is pulled upward of the drum. When the wire is drawn upward in the direction of a point lying along the imaginary extension of the drum axis, the first coil affected by the movement travels radially inward over the underlying coils, approaching the surface of the cylindrical drum, where the horizontal displacement force is halted and only the upward displacement force remains. Two drawbacks to reliable operation are encountered at this phase. First, the coil that is being pulled upward rubs against the surface of the cylindrical body, around which it winds itself up along a more or less helical path, and such rubbing can cause excessive tension or even break the wire. The second drawback is that the coil, in its radial displacement towards the central cylindrical body, may interfere with one of the underlying coils, lifting the lower coil and forming a loop.

Unfortunately, these disadvantages are particularly troublesome at high speeds, and they have limited the paying off of wire from drums to speeds of 200 to 250 meters per minute and do not allow paying off of wire at the speeds of 400 – 500 meters per minute that are common operating speeds attainable with modern twisting machines.

The present invention provides an apparatus which permits paying off wire from a drum without the above-mentioned disadvantages, even at the high speeds required for feeding wire to machines used in the manufacture of telephone cables.

Accordingly, it is an object of the present invention to provide apparatus for paying off a wire, stored in piled-up layers of coils arranged about a cylindrical body that extends in the direction in which wire is to be removed, the diameter of the coils being greater than the diameter of the cylindrical body. More particularly, the invention pertains to means for detaching the wire being paid off from said cylindrical body by guiding and controlling the motion of the wire.

SUMMARY OF THE INVENTION

The present invention overcomes the problems of the prior art in paying off wire from a drum at high speeds. The wire tends to wind off upwardly around the central cylindrical body of the drum, and at high speeds the rubbing friction of the wire as it winds off around the cylindrical body can cause excessive tension in the wire. In accordance with this invention, means for detaching the wire from the cylindrical body are provided to guide and control the motion of the wire as it moves up from coils around the cylindrical body.

According to a preferred embodiment of the invention, the detaching means comprise a ring arranged about the cylindrical body, and having a diameter greater than that of the cylindrical body. The ring is actuated by a motor for rotation about the cylindrical body with a sense of rotation concurrent with the sense of unwinding of the coils. The motor is fed by a generator, and means are provided to rotate said generator at a speed proportional to the linear speed of advancement of the wire, the means for rotating the generator and the diameter of the ring being so chosen that the ratio between the peripheral speed of the ring and the advancement speed of the wire is about 4:1.

The present invention will be better understood from the following detailed description given by way of non-limiting example when read with reference to the accompanying drawings.

BRIEF DESCRIPTION OF THE DRAWINGS

FIG. 3 is an enlarged, side elevation view of the portion of the apparatus shown in FIG. 1 which is used for guiding the wire during its unwinding; and FIG. 4 is a cross-sectional view of the apparatus shown in FIG. 3.

DETAILED DESCRIPTION OF A PREFERRED EMBODIMENT

Figure 2:
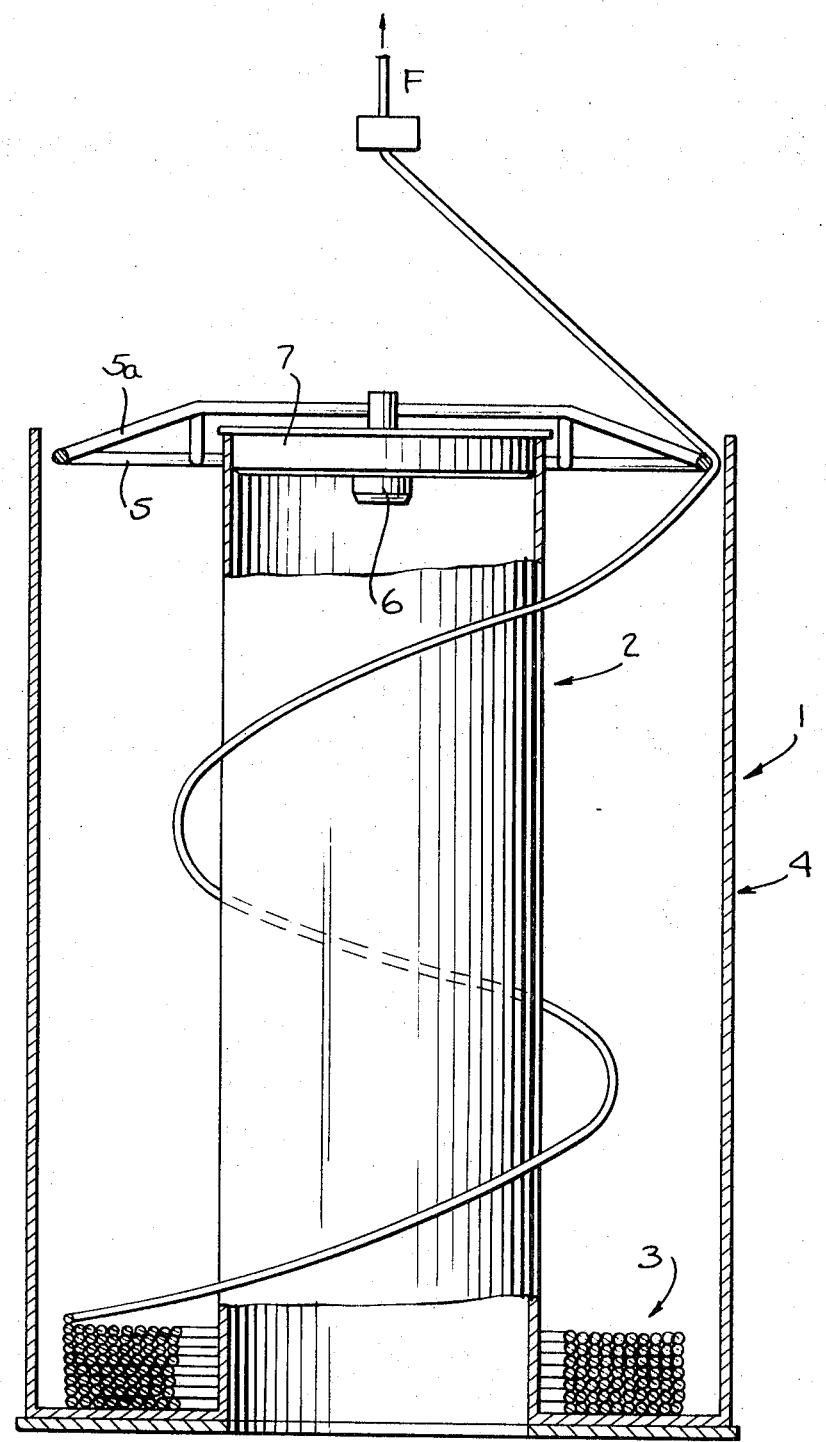
FIG. 2 is an enlarged, cross-sectional view of the drum portion of the apparatus shown in FIG. 1.

The apparatus of the present invention is used for paying off a wire from piled up layers of coils which have, by means of a rotating head of conventional type, been stored inside a drum 1, as shown in FIG. 2. The drum comprises a central cylindrical body 2, about which are arranged the coils 3, and is externally limited by a continuous cylindrical surface 4 coaxially surrounding said cylindrical body at a certain distance from the body. Instead of the continuous cylindrical surface 4 illustrated, there could be a small number of bars situated along a circumference around the cylindrical body 2 to constitute a cage.

The coils 3 of the wire are situated about the cylindrical body and have a diameter greater than that of the body 2. In fact, as mentioned above, the wire will ordinarily come from a prior processing step, such as the application of insulation, and be formed by a rotating head into coil form and the coils then collected around the body 2 in the drum by dropping successive coils in, under the force of gravity.

It is evident that the arrangement of the coils about the cylindrical body 2 will be different depending on whether the drum was motionless during the laying-up of the wire on the drum or rotated at some angular speeds lower than that of the rotating head; however, no matter how the coils may have been collected, the diameter of each successive coil formed by a rotating head is greater than the diameter of the cylindrical body 2, so the wire forming each coil will have at most a limited contact, only along an arc, with the cylindrical body 2, or no contact at all with the body 2.

The wire collected and stored in the drums 1 is intended to be passed to subsequent processing steps, which require unwinding of the wire. Thus the filled drum arrives from a station at which the coils were laid up, or from storage, and is placed in an appropriate space below the guiding system of the invention shown in FIG. 1, for unwinding. The mechanical tension applied to unwind the wire, for instance by twisting machines for forming the wire into quads, is such that the wire is drawn upward in the direction indicated by the arrow F in FIGS. 1, 2 and 3.

In the devices heretofore used, the mechanical tension on the wire pulled the first coil radially towards the central cylindrical body 2. When the wire reaches the body 2, any horizontal displacement force is annulled, and only the upward displacement force remains, which brings the wire 1 of the coil into contact with the cylindrical body surface along a helical path of upward travel.

The apparatus of the present invention provides means for detaching the wire from the cylindrical body 2 by guiding and controlling the wire's motion during its unwinding from the cylindrical body 2.

In a preferred embodiment of the invention here described, the detaching means include a ring 5 situated about the upper end of the cylindrical body 2, the ring 5 having a diameter greater than that of the cylindrical body 2. The ring 5 is shown supported by spokes 5a for rotation by a motor 6 shown in FIGS. 1 and 2 as fixedly mounted on a support 7, the support 7 in turn being mounted on the edges of the central cylindrical body 2, which body 2 is hollow and partially encases the casing of the motor 6.

Means for guiding the wire, including pulleys 8, 9, 10 and 11, shown in detail in FIGS. 3 and 4, are located above the drum 1. Each of the pulleys 8–11 is carried by its own rotating shaft, the respective shafts being journalled in a plate 12 supported by an upstanding support 12', as shown in FIGS. 1–3.

Figure 1:
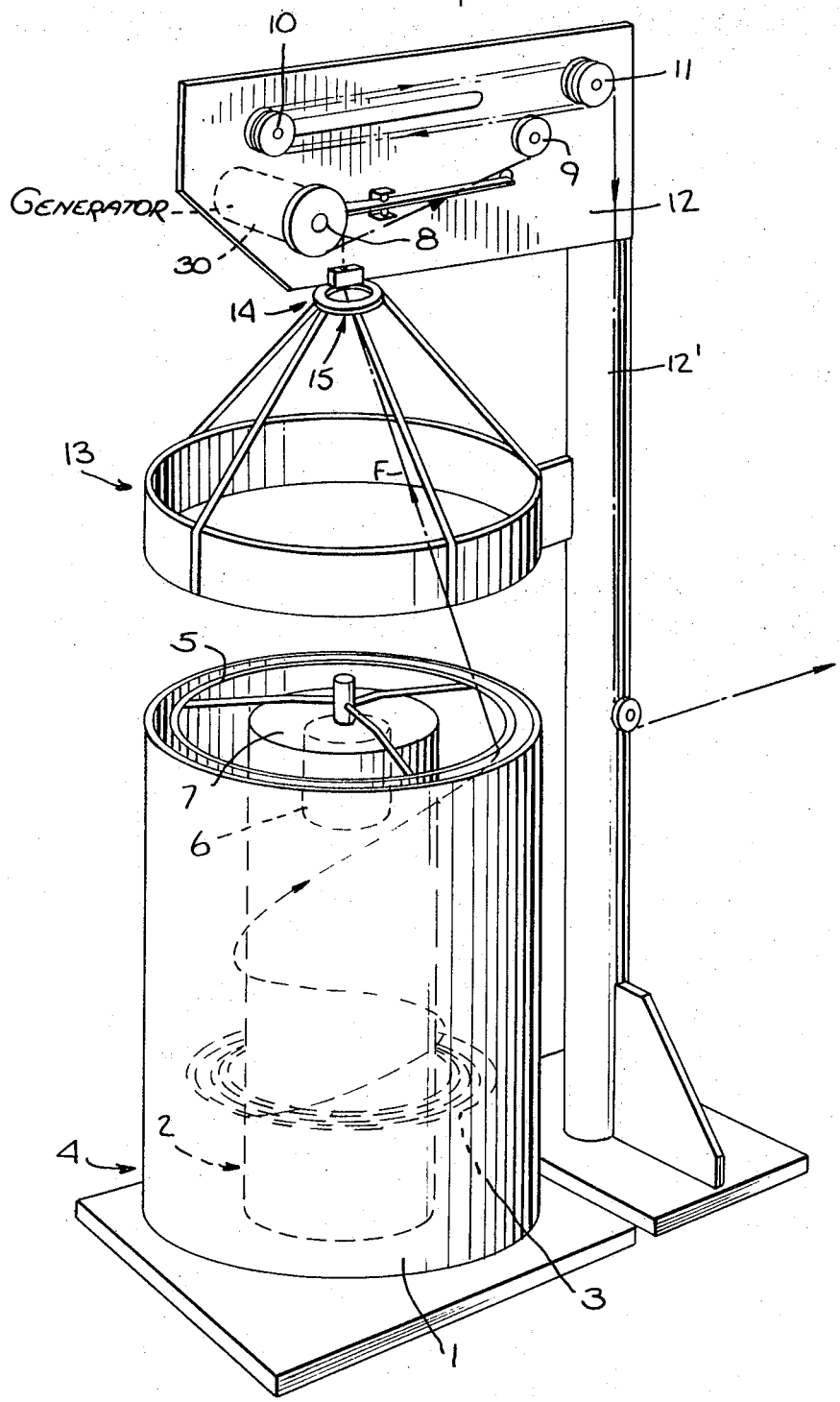
FIG. 1 is a diagrammatic, perspective view of the preferred embodiment of the apparatus of the invention.

A tubular structure 13, terminating at its upper end in a conical portion 14 having a central opening 15, is suspended from the plate 12 as shown in FIG. 1. The axis of the tubular structure 13 and of the central opening 15 is coincident with the axis of the drum 1 and the diameter of the opening 15 is sufficient to allow the passage of the wire stored on the drum 1.

For reasons to be explained hereinafter, the shaft on which the pulley 10 rotates extends through an opening 31 and is mounted on a slide 16 slidable on a guide 17 (see FIGS. 3–4). The two ends of the slide 16 are connected to a wire 18, which wire 18 takes a half turn about each of two pulleys 19 and 20 and a full turn about a pulley 21. The pulley 21 is free to rotate in consequence of stresses transmitted by the wire 18, but such rotation is somewhat restrained by the return force exerted on the pulley 21 by a helical spring 22, the spring 22 being fixed at one of its ends to the shaft of pulley 21 and at its other end to the plate 12.

The wire, paid off from the drum 1 in response to the mechanical tension imparted to it, for instance by twisting machines to which the wire is fed, travels along a path through the central opening 15 and then over the pulleys 8, 9, 10 and 11, about which the wire takes a partial turn, so that these pulleys rotate with a peripheral speed equal to the speed of advancement of the wire. The path of the wire is shown in FIG. 3 by a dot and dash line W.

Furthermore, a generator 30, shown in FIGS. 1 and 4, which can suitably be a dynamo, is opertively connected in such a way that a characteristic of the electric voltage produced at its terminals, e.g., its magnitude or frequency, is proportional to the speed of advancement of the wire W. In the preferred embodiment of the invention, the pulley 8 has its shaft co-axial with and connected to the drive shaft of the generator 30. As will be understood by those acquainted with the art, the output terminals of the generator 30 are connected with the feed terminals of the motor 6, to regulate the angular speed of the motor 6, and consequently of the ring 5, in accordance with the rotation speed of the pulley 8, whereby the ring 5 rotates at a speed which is proportional to the speed of advancement of the wire W.

By appropriately selecting the diameter of the pulley 8 and the diameter of the ring 5, the resulting peripheral speed of the ring 5 can be made greater than the speed of advancement of the wire; more precisely, said diameters are chosen in such a way that the ratio between the peripheral speed of the ring 5 and the advancement speed of the wire is about 4:1. The connections between the generator and the motor are such that the motor 6 and therefore the ring 5, are rotated with a well-defined sense of rotation, i.e., for a person looking from above at the coils wound up about the cylindrical body 2, the motor 6 will rotate the ring 5 clockwise if the coils 3 have been wound up anticlockwise.

Under the above described conditions, the ring 5, turned by the motor 6, rotates in the same sense in which the coils are unwound, and in consequence of the greater peripheral speed of the ring 5 with respect to the speed of advancement of the wire, the coils are subjected to an unwinding action which detaches them from the cylindrical body 2 with which they were in contact. During its unwinding, the wire comes into contact with the rotating ring 5 which, by friction, exerts a tangential dragging action on the wire, which guides the coil to open upward away from the central cylindrical body 2. This action of the ring 5 on the wire reduces and regulates the inward radial displacement of the coil over the plane of the underlying coils, which motion would tend to bring the coil into rubbing contact with the central body 2, and moreover reduces the contact pressure of the coil against said central body 2.

In this way it is possible to counteract the possible interference of the coil being paid off with the underlaying coils and to preclude excessive rubbing of the coil against the central cylindrical body 2, which phenomena, as explained above, have formerly reduced the paying off speed.

The cited ratio of 4:1 between the peripheral speed of the ring 5 and the advancement speed of the wire represents the operating condition at which the apparatus is most effective. In fact, it can be understood that, with a sense of rotation as defined above, the ring 5 must rotate at a peripheral speed greater than the advancement speed of the wire; if the two speeds were equal, each point of the wire would touch a different point of the ring 5, in which case the ring would not facilitate the detachment of the wire from the cylindrical body 2 by dragging the wire outward. It is also evident that the speed of the ring 5, turning in the sense mentioned above, cannot exceed the speed established by the cited 4:1 ratio by any large amount, since in such conditions the amount of coils paid off from the cylindrical body 2 would be excessive with respect to that required by the twisting machines or other processes to which the wire is fed. The result would be a useless amount of wire accumulated between the cylindrical body 2 and the outer surface 4 of the drum, resulting in poor operation when the excess wire is pulled upward.

The main advantage of the apparatus of the invention resides in the fact that, as the peripheral speed of the ring 5 is correlated with the advancement speed of the wire, the ring 5 carries out a regular unwinding action during all the production steps. In fact, this would not happen if the ring 5 had a constant peripheral speed even if that speed were greater than the advancement speed of the wire. The ring 5 should accordingly not simply be driven by a motor rotating at a fixed rate of rotation. If the ring 5 were rotated at a fixed rate, in the starting phase, in which the wire has a very low advancement speed, the ring 5 would tend to pay off a large number of coils, with a consequent accumulation of the wire outside the cylindrical body 2 and a risk of tangles when the wire is pulled upward upon an increase of its advancement speed.

A furhter advantage of the apparatus in the preferred embodiment resides in the fact that no intervention by an operator is necessary, as would be required if an operator controlled the speed of a motor.

A still further advantage of the apparatus lies in the fact that the guiding means described and shown provide the possibility of adjusting the conditions under which the wire is unwound from the drum 1.

This adjustment can be provided by a mechanical brake 23, shown in FIGS. 3 and 4, having a portion 23b frictionally engaging the pulley 8. The brake 23 has an arm 23a, which can pivot about a pivot point 24. One end 25 of the arm 23a is restrained by a helical spring 26 attached thereto. At a point intermediate said end 25 and the pivot point 24, a force contrary to that of the spring 26 acts on the arm 23a, this force being applied by the upper surface of an element 27 which can be a screw operatively connected to the pulley 21 or its shaft to be moved toward or away from the arm 23a according to the rotation of the pulley 21 or can be a cam which, rotating with the pulley 21, varies its action on the arm 23a.

The movement of the pulley 21, resulting from movement of the slide 16, originates a pivital motion of the arm 23a about the point 24, so that the brake portion 23b presses in more firmly or less firmly against the pulley 8.

With a system of this kind, through the equilibrium resulting from the tension of the wire as it passes over the pulley 10 with the contrasting action of the spring 22 and of the brake 23, acting through the arm 23a, it is possible to control the tension on the wire, since such tension can be preestablished at will by varying the return force of the spring 22.

Moreover, the assembly formed by the pulley 10 and by the slide 16 movable in the guide 17 constitutes a take-up arrangement for accumulating small amounts of wire, which operates by absorbing sudden increases of tension due to possible difficulties in the unwinding of the wire.

The displacement of the slide 16 can also be used to stop the unwinding process by closing an electric contact (not shown) in the event that, for any reason, the wire may find an obstacle to its unwinding. Such an automatic shut-off will prevent possible breakage of the wire itself.

Although the present invention has been described and represented by way of non-limiting example, various obvious modifications to the whole apparatus and to its details will suggest themselves to those skilled in the art within the spirit and scope of the present invention.

What is claimed is:

1. Apparatus for paying off wire stored in superimposed connected coils, said apparatus comprising a cylindrical body having said coils therearound, the exterior diameter of said body being smaller than the interior diameter of said coils whereby said coils are loosely arranged around said body, detaching means mounted for rotation around the axis of said body and spaced from said coils in the direction of paying off, said detaching means having a portion thereof engageable with said wire as it is payed off and movable in a circular path around said axis, and motor means connected to said detaching means and rotating said detaching means in a direction which unwinds said coils and moving said portion of said detaching means around said axis at a speed which is at least four times greater than the linear paying off speed of said wire.

2. Apparatus as set forth in claim 1, wherein said detaching means is a member having a circular periphery of a diameter greater than that of said body, said member being mounted for rotation at one end of said body with its axis of rotation substantially co-axial with said axis of said body.

3. Apparatus as set forth in claim 2, wherein said member comprises a ring and a plurality of spokes extending from said axis to said ring for supporting said ring from its axis of rotation and wherein said motor means comprises a variable speed motor connected to said ring for rotating said ring.

4. Apparatus as set forth in claim 1, wherein said motor means comprises an electric motor which is responsive in speed of rotation to a characteristic of the voltage applied thereto and further comprising electric generator means responsive to the paying off speed of said wire, said generator means providing an output voltage which varies in a characteristic thereof in portion to the paying off speed of said wire and means connecting said motor to said generator means for controlling the speed of said motor in accordance with the paying off speed of said wire.

* * * * *